Oct. 22, 1963    W. J. O'CONNOR    3,107,524
TEST SPECIMEN HOLDER MECHANISM AND THE LIKE
Filed March 1, 1961
Fig. 1.
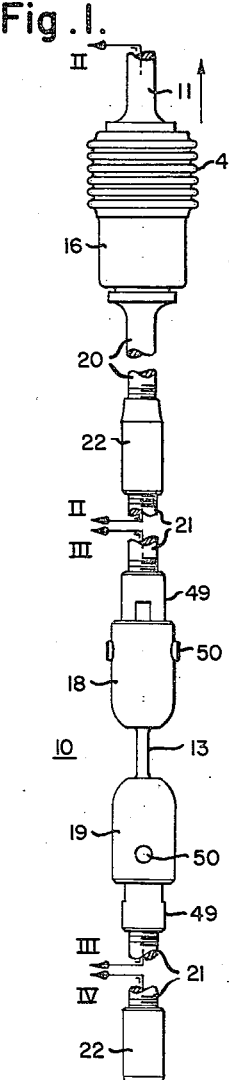
Fig. 2.
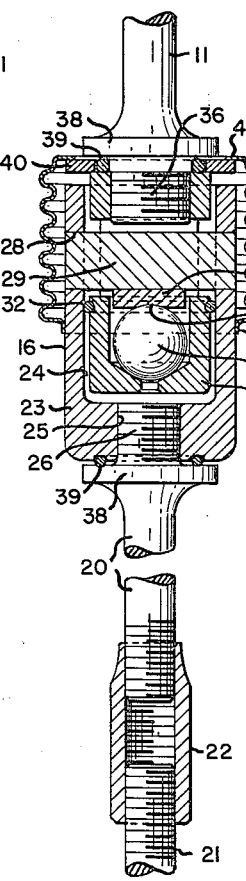
Fig. 3.
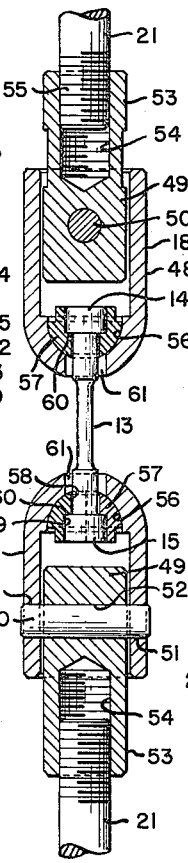
Fig. 4.
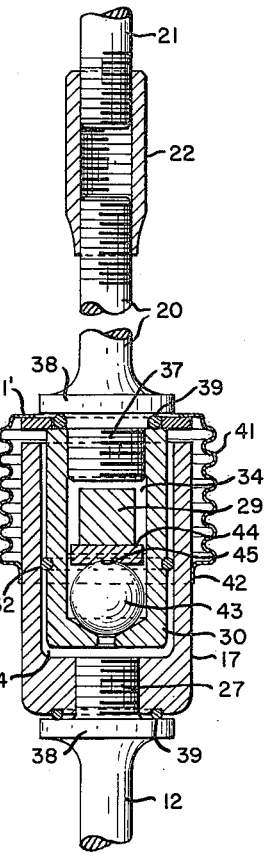
Fig. 5.    Fig. 6.
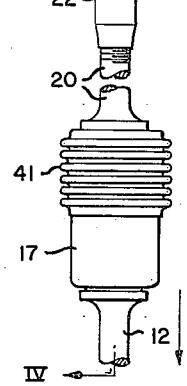    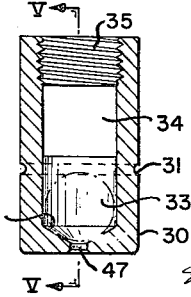
Fig. 7.
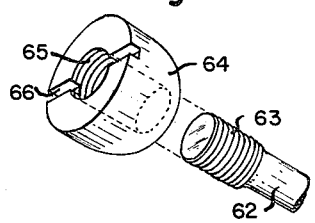
INVENTOR
Walter J. O'Connor

United States Patent Office 3,107,524
Patented Oct. 22, 1963

3,107,524
TEST SPECIMEN HOLDER MECHANISM
AND THE LIKE
Walter J. O'Connor, Grove City, Pa., assignor to Satec
Corporation, a corporation of Pennsylvania
Filed Mar. 1, 1961, Ser. No. 92,702
7 Claims. (Cl. 73—103)

This invention relates to holder mechanism for test specimens or the like to be subjected to tensile stress with the specimen or the like in alignment with a force or load applying such stress. More particularly, this invention pertains to holder mechanism for tensile or creep test specimens to provide aligned and even stressing during test, whether testing at ambient or at elevated temperatures.

In holder mechanisms of this invention test specimens or the like such as those used in creep or tensile tests are automatically self-aligned and stressed evenly by such a holder mechanism which connects such specimen or the like to a testing machine or other stress applying device. Further, such holder mechanism will not deteriorate even though some of its members are subjected to elevated temperatures when testing is so performed as in the case of some creep tests. Moreover, such holder mechanism is readily safeguarded against the introduction of dust or other foreign substances, or detrimental action in the working thereof, with corresponding assurance of accuracy and precision in performance of mechanism of this invention. Moreover, holder mechanism of this invention can readily be assembled and disassembled, connected and disconnected from test specimens or the like and testing machines used. Additionally, the manufacture and operation of the holder mechanism of this invention may be readily and economically accomplished.

Other objects, features and advantages of this invention will be apparent from the following description and the accompanying drawings, which are illustrative only, in which FIGURE 1 is a view in elevation of a holder mechanism embodiment of this invention;

FIGURE 2 is a detail view in cross section of the upper bearing portion of the embodiment shown in FIGURE 1 taken along line II—II of FIGURE 1;

FIGURE 3 is a detail view in cross section of the grip portion of the embodiment shown in FIGURE 1 taken along line III—III of FIGURE 1;

FIGURE 4 is a detail view in cross section of the lower bearing portion of the embodiment shown in FIGURE 1 taken along line IV—IV of FIGURE 1, FIGURE 4 being rotated 90° for purposes of illustration from the plane of the section of FIGURE 2;

FIGURE 5 is a detail view in cross section of an inner cage in a bearing in the illustrated embodiment of this invention taken along line V—V of FIGURE 6;

FIGURE 6 is a detail view in cross section of the inner cage shown in FIGURE 5 taken along line VI—VI of FIGURE 5; and FIGURE 7 is a view of a modified self-aligning bit utilizable with a threaded test specimen in the illustrated embodiment of this invention.

Referring to FIGURES 1 to 6, inclusive, of the drawing, there is illustrated therein a holder mechanism 10 of this invention. Mechanism 10 has two opposed portions in axial alignment and comprises upper and lower force rods 11 and 12, the outer lower ends of which may be threaded, or provided with eyes, or otherwise, for respective connection, usually pivotal at at least one end, to a testing machine beam or other device for applying a tensile stress axially through the rods 11 and 12 to a conventional test specimen 13 or the like held by mechanism 10 in automatic self-aligning position with the line of stressing force exerted thereupon through the force rods 11 and 12 as they are moved in a separating direction. Specimen 13, as shown, is a test specimen of steel or other metal, or of other material, and is provided with cylindrical button heads 14 and 15 at the respective ends thereof. Mechanism 10 also includes upper and lower bearings 16 and 17 and upper and lower grips 18 and 19, respectively, the specimen 13 when connected to the grips serving as the element to be stressed because of its connection to the upper and lower opposed portions of holder mechanism 10. In this description, terms such as "upper" and "lower," "horizontal" and "vertical," and others, are relative terms since the mechanism and its parts may be used in other positions in space.

Outer pull rods 20 and inner pull rods 21 in the upper and lower portions of mechanism 10 are respectively connected by turnbuckle sleeves 22, such rods and sleeves in each portion serving to connect bearing 16 and grip 18 in the one case and bearing 17 and grip 19 in the other. The two bearings 16 and 17 are alike and are utilized with the same orientation in mechanism 10. Each such bearing comprises a cylindrical cup-shaped outer cage 23 with a bore 24 opening out through the top thereof and a tapped hole 25 extending through the bottom of cage 23 to engage a threaded stud end 26 of upper outer pull rod 20 in the case of bearing 16 and a threaded stud end 27 of lower force rod 12 in the case of bearing 17. Each cage 23 is diametrically broached at 28 to provide square holes to receive the ends of a square bridge bar 29 which crosses bore 24 and is held in the broached openings 28 by a press fit. Each bearing, further, has a cylindrical inner cage 30 which is suspended in bore 24, the outside of cage 30 being provided with a peripheral groove 31 for an O-ring 32 to act generally as a resilient centering spacer relative to cage 23. Each inner cage 30 is provided with a vertical central bore 33 which is discontinuous across a transverse opening 34 extending through from one side to the other for the purpose of the passage therethrough of bar 29 without contact between such bar and cage 30. The upper end 35 of bore 33 is threaded to engage a threaded stud end 36 of force rod 11 in the case of bearing 16 and a threaded stud end 37 of lower outer pull rod 21 in the case of bearing 17.

Each of the rods having a threaded stud end connected to a bearing is provided at the bearing end thereof with an annular flange 38 to compress an O-ring 39 against the adjoining portion of the respective bearing to seal them at such points so that the interiors may be filled with grease or heavy oil to facilitate operation and exclude dust and other foreign substances which otherwise might enter the bearing to the detriment of the alignments and stress conducting action in a test operation or the like. Washer 40 is utilized with the uppermost flanges 38 cooperating with each bearing to bind, in a sealing fashion, an interior annular flange 41' of a sylphon casing 41, the lower end 42 of which is secured in a sealing fashion to outer cage 23 by welding or brazing, thus completing the enclosure against entry of extraneous matter in the case of each bearing while leaving the bearings free to be disconnected and reconnected to the respective rods which engage each of them.

A stress or load transmitting ball 43 is in the bottom of each inner cage 30 within bore 33. Each ball bears upon a bearing pad 44, the uper side of which is in surface engagement with the underside of bar 29. The lower side of pad 44 engages the top of ball 43 and spherical depression 45 preferably is provided in the underside of pad 44 to furnish surface engagement with respect to the top ball 43. Pad 44 also acts as a float plate to prevent battering of bar 29 by the adjacent ball 43 and thereby inhibit deformation of the bar and misalignment of the load force transmission which might otherwise occur. The bottom of each bore 33 of each inner cage 30 is provided with a conical end 46 which during operation of mechanism 10 bears uniformly against the underside of its ball 43. The bottom of each cage 30 is provided further with a hole 47 through which the ball may be pushed out of the cage when the bearing is disassembled.

Each of the grips 18 and 19 comprises a cylindrical cup portion 48 and tongue portion 49 pivotally connected together by a pin 50. Opening 51 through opposite sides of each cup are provided to receive the ends of pin 50 with a loose fit and the inner end of each tongue 49 also is provided with a hole 52 through which pin 50 passes in a loose fit fashion, to inhibit or eliminate vibration and provide free pivotal action even in the event some oxide should form, e.g., when the grips and specimen are enclosed in a furnace of any suitable kind used for "hot" tensile or creep or other "hot testing" work. The outer end 53 of each tongue is counterbored and tapped at 54 to engage the inner threaded end 55 of the adjoining inner pull rod 21. The inner end of each tongue 49 is spaced from the inside of cup 48 so that a true universal articulation is provided during testing when a specimen is held by the grips, the axes of the respective pins 50 preferably being positioned at right angles to each other as shown in FIGURES 1 and 3.

The inner end of each cup 48 is provided with a semispherical seat 56 which has a fine surface finish to cooperate with the semispherical face of a bit 57 adapted to engage and hold a test specimen or the like.

Each bit 57 cooperating with a specimen 13 having button heads 14 and 15, is split longitudinally through the axis and provided with an opening 58 which when the two pieces of the bit are together surround the neck of the specimen. The opening 58 in each bit is enlarged at 59 to accommodate the respective head 14, or 15, as the case may be, and provide a shoulder 60 which engages the underside of each head to hold the specimen 13 or the like in automatic self-aligning position during the stress testing or other pull action exerted thereon. The inner end of each cup 48 is provided with an axial hole 61 through which the test specimen engaged may extend with plenty of clearance.

Conventional specimens may also be made in other forms, such as in the form of specimen 62 shown in FIGURE 7 with a threaded head 63 at each end thereof, for holding in holder mechanism of this invention. With such threaded ends, the bits used may take the form of a semispherical bit 64 to act in the manner of bit 57 in holder mechanism 10. Each bit 64 is one piece and provided with an axial opening 65 threaded to engage the threads of the adjoining head 63 of specimen 62. A slot 66 may be provided across the outer end of bit 64 for use with a screw driver, for example, to assist in attaching and detaching the bit from the threaded end of a specimen engaged thereby. Connecting up holder mechanism 10 to a fresh specimen to be tested, disengaging it from a specimen which has been tested, or adjusting the length of the respective portions of the mechanism, is simply and readily performable because, among other features, of the respective threaded ends of the respective pull rods in the mechanism, the adjustment provided by the turnbuckle sleeves 22, and the ready engagement and disengagement of the pins 50 from the grips so that the cups and tongues thereof can be assembled and reassembled in the course of recurrent operations utilizing apparatus of this invention.

In operation, an outward or pulling force upon the respective force rods exerted in the direction of the arrows shown in FIGURE 1 places whatever specimen is in holder mechanism 10 in tension with such force usually being increased to a desired extent after the specimen has been gripped. The upper portion of mechanism 10 has each of the rods therein in tension and inner cage 30 of bearing 16 shown in FIGURE 2 pushes its ball 43 and pad 44 up against its bar 29 to transmit that force through the pull rods to tongue 49 of grip 18 and from thence through its pin 50 and semispherical bit 57 to a specimen such as specimen 13. The lower portion of the mechanism 10 transmits the tensile stress through its force rod 12 to outer cage 23 of bearing 17 which causes its bar 29 to press downwardly upon its pad 44 and ball 43 shown in FIGURE 4 to exert a pull through its inner cage 30 upon the lower pull rods 20 and 21. Any specimen such as specimen 13 or 62, or the like, may be tested in the mechanism with automatic self-alignment. The test may take place at ambient temperature, or a furnace may be used to enclose the gripped specimen and the grips without deterioration in view of the use of semispherical bearing surfaces to align and hold the specimen ends. Furthermore, the tensile force exerted by and through holder mechanism of this invention is uniformly distributed to provide accurate and safe operation at all time, even when the preparation of the specimen may be at fault, as when any machining thereof may not be completely true.

Various changes may be made in the illustrated embodiment and other embodiments provided without departing from the spirit of this invention or the scope of the appended claims.

I claim:

1. A test specimen holder mechanism and the like comprising, in combination, upper and lower mechanism portions in opposed axial alignment, each portion terminating at its inner end in a grip, a force rod at the outer end of each such portion, a bearing in each said portion connected to its respective grip by pull rod means having threaded ends, means for adjusting the over all length of said pull rod means, each grip having an outward axially facing substantially semispherical seat, a bit having a substantially semispherical surface adapted to engage said seat and to hold one end of said test specimen, each bearing having nested inner and outer cage members axially movable relative to one another to a limited extent substantially out of contact with one another, force transmitting means including a ball within said inner cage member to transmit force from one of said cage members to the other in axial alignment with the axis of said test specimen held by said bit, and means for sealing the interior of said bearing.

2. A holder mechanism as set forth in claim 1, in which, each said grip has a cup portion and a tongue portion, a readily removable pin loosely fitting said cup portion and said tongue portion respectively and pivotally connecting the same, the axes of the pins of said grips being at right angles in said holder mechanism, said force transmitting means having a bridge bar extending across the inside of said outer cage member in fixed relation thereto, said bridge bar extending through the interior of said inner cage member and substantially out of contact therewith, said ball being positioned between the bottom of said inner cage member and said bar, a bearing pad positioned between said ball and said bar in surface area contact with each, and said means for sealing has a sylphon casing covering said outer cage member outwardly of the ends of said bar.

3. A test specimen holder mechanism and the like, comprising, in combination, a bearing having a cylindrical cup-shaped outer member, a cylindrical cup-shaped inner member positioned substantially within said cup-shaped outer member and out of contact therewith, means for pulling said respective members in opposite directions, a cross member fixed to said outer member spaced from the ends thereof and extending across the interior thereof through an intermediate portion of said inner member out of contact therewith, spherical bearing means within said inner member in operative connection with said cross member when said pulling means are operative, and a bearing seat for said spherical bearing means having substantially the same curvature to provide surface area pressure between said cross member and said spherical bearing means, said inner member having an internal conical end for said spherical bearing means in opposed facing relation to said bearing seat.

4. In a test specimen holder mechanism and the like, apparatus comprising, in combination, a grip having a cup-shaped portion opening axially outwardly and a tongue portion outwardly thereof, means pivotally connecting said portions in spaced relation to one another, a spherical surface seat inside said cup-shaped portion concave toward the outer end of said cup-shaped portion, a bit having a spherical surface adapted to engage said seat in self-aligning fashion, said bit having an axially extending central opening adapted to receive and hold the end of a test specimen, and said grip having an opening through the inner end of said cup-shaped portion in registry with said central opening through which said test specimen may extend.

5. A test specimen holder mechanism and the like, comprising, in combination, a bearing having an outer member, an inner member positioned substantially within said outer member and out of contact therewith, means for pulling said respective members in opposite directions, a cross member fixed to said outer member out of contact with said inner member, spherical bearing means within said inner member in operative connection with said cross member when said pulling means are operative, a grip having an inner portion and an outer portion pivotally connected together, a spherical surface seat in said inner portion, means connecting said outer portion to one of said means for pulling, a bit having a spherical surface adapted to engage said seat in self-aligning fashion and to receive and hold the end of a test specimen.

6. A test specimen holder mechanism and the like comprising, in combination, mechanism portions in opposed axial alignment, each portion terminating at its inner end in a grip, a bearing in each said portion connected to its respective grip by pull rod means having threaded ends, each grip having a spherical surface seat, a bit having a spherical surface adapted to engage said seat and to hold one end of said test specimen, each bearing having nested inner and outer members axially movable relative to one another to a limited extent, ball bearing means to transmit force from one of said members to the other in axial alignment with the axis of said test specimen held by said bit, each said grip having a cup portion and a tongue portion, a pin pivotally connecting said cup portion and said tongue portion in a loose fitting fashion, each said bearing having a bridge bar fixed to said outer member, said bridge bar being substantially out of contact with said inner member, said ball bearing means being positioned between said inner member and said bar, and a bearing pad positioned between the ball bearing means and said bar.

7. A test specimen holder mechanism and the like, comprising, in combination, a bearing having a cup-shaped outer member, a cup-shaped inner member positioned substantially within said cup-shaped outer member and out of contact therewith, means for pulling said respective members in opposite directions, a cross member fixed to said outer member and extending across the interior thereof through said inner member out of contact therewith, spherical bearing means within said inner member in operative connection with said cross member when said pulling means are operative, means providing surface area pressure between said cross member and said spherical bearing means, and bearing sealing means comprising a flexible casing extending between the outside of said outer member and the open end thereof and in which said pulling means are provided with annular flanges adjacent said bearing to bear against resilient rings to seal the respective ends of said bearing, a washer positioned around said open end, one of said flanges pressing the adjoining end of said flexible casing against said washer.

References Cited in the file of this patent
UNITED STATES PATENTS

| 769,746 | Hewlett | Sept. 13, 1904 |
| 770,651 | Peters et al. | Sept. 20, 1904 |
| 1,616,325 | Minster | Feb. 1, 1927 |

FOREIGN PATENTS

| 448,130 | Great Britain | June 2, 1936 |
| 842,001 | Great Britain | July 20, 1960 |